June 20, 1967  D. H. HUBBLE ETAL  3,326,636
METHOD OF MAKING MAGNESIUM OXIDE FIBERS
Filed Feb. 15, 1965
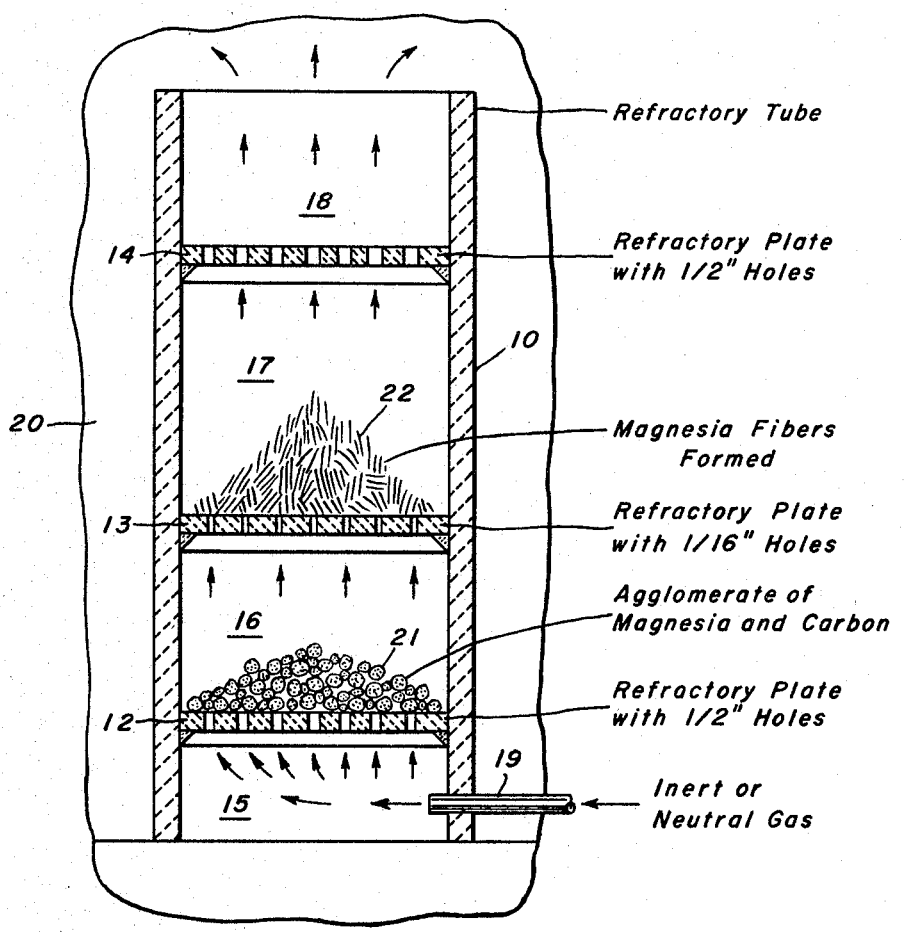
INVENTORS.
DAVID H. HUBBLE and
WILLIAM H. POWERS
By Donald G. Dalton
Attorney 3,326,636
METHOD OF MAKING MAGNESIUM OXIDE FIBERS
David H. Hubble and William H. Powers, Franklin Township, Westmoreland County, Pa., assignors to United States Steel Corporation, a corporation of Delaware
Filed Feb. 15, 1965, Ser. No. 432,613
6 Claims. (Cl. 23—201)

This invention relates to an improved method of making magnesium oxide fibers.

Conventionally refractory materials, such as magnesia, are converted to fibrous form by rapidly cooling them from a molten state. The resulting fibers are amorphous. If used for long periods at temperatures above 2300° F., amorphous fibers devitrify (change from an amorphous to a crystalline structure). As a result, they lose strength, size and resiliency.

An object of our invention is to provide an improved method of making magnesia fibers which are not subject to devitrification and the resulting loss of properties.

A more specific object is to provide a method of making magnesia fibers in which the magnesia is volatilized and re-condensed under controlled conditions to produce single-crystal fibers capable of withstanding high temperatures for long periods.

In the drawing:

The single figure is a diagrammatic vertical section of an apparatus in which we make magnesia fibers by our method.

The apparatus includes an upright refractory tube 10 and lower, middle and upper perforate horizontal refractory partitions 12, 13 and 14 mounted in said tube. The partitions divide the interior of the tube into chambers 15, 16, 17 and 18. The middle and upper partitions 13 and 14 are removable to afford access to chambers 16 and 17. Preferably the openings in the middle partition 13 are somewhat finer than the openings in the lower and upper partitions 12 and 14. For example, the openings in the middle partition may be 1/16 inch in diameter and the openings in the other partitions 1/2 inch in diameter. We connect a gas inlet 19 to the lower chamber 15, and we place the tube within a furnace 20 heated to a temperature within the range of about 2000° to 3200° F.

We place a charge 21 of magnesia and carbon in chamber 16. The magnesia can be dense periclase, dead-burned magnesite, dead-burned dolomite, or lightly calcined magnesium hydroxide, magnesium carbonate or dolomite. The carbon can be coke, coke breeze, lamp black, graphite, pitch, carbon black, etc. We prefer dense periclase and carbon black or lamp black for highest fiber yields. We form our charge 21 by agglomerating a mixture of finely divided magnesia and carbon in a conventional balling drum or equivalent. Preferably the carbon is minus 325 mesh. We can use mixtures which contain as little as 0.5 percent carbon, but we prefer about 2 to 50 percent carbon and 98 to 50 percent magnesia. The agglomerates can be used simply in dry-pelletized form, but we obtain higher fiber yields when we first preheat the agglomerates to a temperature of about 2000° F. to 2800° F. in a reducing atmosphere.

We introduce a stream of relatively cool inert or neutral gas to the lowermost chamber 15 via the inlet 19. This gas can be at ambient temperature, and most conveniently is nitrogen, although we can use the rare gases, such as argon or helium. At the furnace temperature of 2000° F. to 3000° F. in the presence of carbon, magnesia volatilizes without passing through a liquid state. The gas stream passes upwardly through the openings in the lower partition 12 and contacts the charge 21. It picks up volatilized magnesia from the charge and carries the vapors to the openings in the middle partition 13. Here the vapors are demoved from contact with carbon and subject to the lower temperature of the gas; hence they re-condense to form fibers 22. The gas stream carries the fibers into chamber 17, where they are deposited. As the gas passes through the openings in the middle partition 13, where the fibers form, it should have a velocity of 1,000 to 15,000 feet per minute, or preferably 8,000 to 12,000 feet per minute.

The limits we have stated are critical to the formation of fibers. If the gas velocity is too low, the magnesia re-condenses in powder form. If too high, the fibers are short and broken. The presence of even mildly oxidizing or reducing gases reduces or destroys fiber formation.

As a specific example to demonstrate our invention, we agglomerated a mixture of 75 percent periclase fines and 25 percent lamp black into 1/4 to 1/2 inch diameter balls in a conventional balling drum. The periclase analyzed 98 percent MgO. We fired the balls in a closed refractory container at 2500° F. for 5 hours. We placed the fired balls in the chamber of a refractory tube as illustrated in the drawing, placed the tube in a furnace heated to 2500° F., and introduced a stream of nitrogen at a velocity of 10,000 feet per minute. We calculated this velocity on the basis of the measured gas flow into the furnace and the total area of the openings in partition 13 where the fibers form. We continued this treatment for one hour and obtained a fiber yield of about 10 percent of the original weight of magnesia. Petrographic and X-ray examination showed the fibers were essentially crystalline magnesia and were 1/4 to 1 1/2 inches in length and 2 to 8 microns in diameter. We heated samples of these fibers to 3200° F. for 5 hours and found their crystalline structure unchanged.

From the foregoing description it is seen that our invention affords a simple method for producing magnesia fibers that have superior properties. Each fiber appears to be a single crystal. In this form the fibers can withstand high temperatures for long periods without damage.

While we have shown and described only a single embodiment of our invention, it is apparent that modifications may arise. Therefore, we do not wish to be limited to the disclosure set forth but only by the scope of the appended claims.

We claim:

1. A method of making magnesia fibers comprising mixing finely divided magnesia and carbon in proportions of 0.5 to 50 percent carbon and the remainder essentially magnesia, heating the mixture to a temperature within the range of about 2000 to 3000° F. to volatilize the magnesia directly from its solid state, contacting the heated mixture with a stream of inert gas to pick up the volatilized magnesia and carry it away from the carbon, and re-condensing the magnesia from the gas to form fibers, the gas being relatively cool before contacting said mixture and having a velocity immediately ahead of the location where the fibers form in the range of 1,000 to 15,000 feet per minute.

2. A method as defined in claim 1 in which the mixture of magnesia and carbon is agglomerated to form balls.

3. A method as defined in claim 2 in which the balls are preheated to a temperature in the range of about 2000 to 2800° F. in a reducing atmosphere before the inert gas is brought into contact therewith.

4. A method as defined in claim 2 in which the magnesia is in the form of dense periclase, the carbon is selected from the group consisting of carbon black and lamp black, and the inert gas is nitrogen.

5. A method of making magnesia fibers comprising mixing finely divided magnesia and carbon in proportions of 2 to 50 percent carbon and 98 to 50 percent magnesia, agglomerating the mixture into balls, heating the balls to a temperature within the range of about 2000 to 3000° F. to volatilize the magnesia directly from its solid state, contacting the heated balls with a stream of inert gas to pick up the volatilized magnesia and carry it away from the carbon, and re-condensing the magnesia from the gas to form fibers, the gas being relatively cool before contacting said mixture and having a velocity immediately ahead of the location where the fibers form in the range of about 8,000 to 12,000 feet per minute.

6. A method as defined in claim 5 in which the balls are preheated to a temperature in the range of about 2000 to 2800° F. in a reducing atmosphere before the inert gas is brought into contact therewith.

References Cited

UNITED STATES PATENTS

| | | | |
|---|---|---|---|
| 1,450,464 | 4/1923 | Thomson | 23—294 |
| 3,125,416 | 3/1964 | Ryshkewitch et al. | 23—183 |
| 3,147,085 | 9/1964 | Gatti | 23—142 X |

FOREIGN PATENTS

| | | |
|---|---|---|
| 998,166 | 7/1965 | Great Britain. |

OSCAR R. VERTIZ, *Primary Examiner.*

G. T. OZAKI, *Assistant Examiner.*